(12) United States Patent
Freeman et al.

(10) Patent No.: US 6,399,730 B1
(45) Date of Patent: Jun. 4, 2002

(54) WATER ABSORBING POLYMER

(75) Inventors: Clarence S. Freeman; Matthew Max Freeman; Jon Joseph Freeman, all of Channelview, TX (US)

(73) Assignee: Waterguard Telecommunications Technologies, Inc., Houston, TX (US)

( * ) Notice: Subject to any disclaimer, the term of this patent is extended or adjusted under 35 U.S.C. 154(b) by 0 days.

(21) Appl. No.: 09/747,635

(22) Filed: Dec. 21, 2000

Related U.S. Application Data

(63) Continuation of application No. 08/973,574, filed as application No. PCT/US96/09132 on Jun. 6, 1996, now Pat. No. 6,291,605, which is a continuation-in-part of application No. 08/486,079, filed on Jun. 7, 1995, now abandoned, which is a continuation-in-part of application No. 07/855,458, filed on Mar. 19, 1992, now abandoned, which is a continuation of application No. 07/534,177, filed on Jun. 6, 1990, now abandoned.

(51) Int. Cl.$^7$ .................. C08F 226/02; C08F 222/02
(52) U.S. Cl. ............... 526/310; 526/88; 526/318.43
(58) Field of Search ................... 526/306, 308, 526/310, 318.43, 319, 328.5

(56) References Cited

U.S. PATENT DOCUMENTS

| | | |
|---|---|---|
| 2,280,802 A | 4/1942 | Depew |
| 2,810,716 A | 10/1957 | Markus |
| 2,956,046 A | 10/1960 | Glavis et al. |
| 3,220,960 A | 11/1965 | Wichterle et al. |
| 3,240,725 A | 3/1966 | Raymond et al. |
| 3,644,305 A | 2/1972 | Frisque et al. |
| 3,661,815 A | 5/1972 | Smith |
| 3,669,103 A | 6/1972 | Harper et al. |

(List continued on next page.)

FOREIGN PATENT DOCUMENTS

| | | |
|---|---|---|
| DE | 3106711 | 9/1982 |
| DE | 3831261 | 3/1990 |
| GB | 869333 | 5/1961 |
| GB | 1126152 | 9/1968 |
| JP | 73008756 | 3/1973 |
| JP | 49105889 | 10/1974 |
| JP | 5749643 | 3/1982 |
| JP | 1268701 | 10/1989 |
| WO | 8103659 | 12/1981 |

OTHER PUBLICATIONS

Smith & Van Ness, "Introduction to Chemical Engineering Thermodynamics", McGraw–Hill Book Co., New York, 1975, pp. 56–73, 290–299.
Billmeyer, Jr., "Textbook of Polymer Science", John Wiley & Sons, New York, 1984, pp. 4 and 5.

(List continued on next page.)

Primary Examiner—Christopher Henderson
(74) Attorney, Agent, or Firm—Dwayne L. Mason; Akin Gump Strauss Hauer & Feld, L.L.P.

(57) ABSTRACT

A process for producing a substantially dry polymer particle powder. A mixture of polymerization reagents is formed from a mixture of at least one monomer source and a solvent selected from the group consisting essentially of water and organic solvents and an initiator source. The mixture of polymerization reagents is sprayed into a heated, controlled atmosphere, forming droplets of the mixture which are allowed to fall through the heated, controlled atmosphere for a sufficient period of time to obtain a desired degree of polymerization. The solvent is continuously evacuated from the atmosphere during the polymerization process.

1 Claim, 1 Drawing Sheet

U.S. PATENT DOCUMENTS

| | | |
|---|---|---|
| 3,926,891 A | 12/1975 | Gross et al. |
| 3,980,663 A | 9/1976 | Gross |
| 4,020,256 A | 4/1977 | Zweigle et al. |
| 4,057,521 A | 11/1977 | Gross |
| 4,071,650 A | 1/1978 | Gross |
| 4,076,663 A | 2/1978 | Masuda et al. |
| 4,098,977 A | 7/1978 | Zweigle et al. |
| 4,135,043 A | 1/1979 | Kast et al. |
| 4,154,910 A | 5/1979 | Tanaka et al. |
| 4,172,776 A | 10/1979 | Singelyn |
| 4,273,831 A | 6/1981 | Singelyn |
| 4,487,898 A | 12/1984 | Kato et al. |
| 4,529,739 A | 7/1985 | Scott et al. |
| 4,550,213 A | 10/1985 | Thigpen et al. |
| 4,623,706 A | 11/1986 | Timm et al. |
| 4,654,393 A | 3/1987 | Mikita et al. |
| 4,656,232 A | 4/1987 | Nakaki et al. |
| 4,769,427 A | 9/1988 | Nowakowsky et al. |
| 4,870,143 A | 9/1989 | Hashiguchi et al. |
| 4,985,518 A | 1/1991 | Alexander et al. |
| 5,010,150 A | 4/1991 | Hennig et al. |
| 5,154,713 A | 10/1992 | Lind |
| 5,269,980 A | 12/1993 | Levendis et al. |
| 5,314,420 A | 5/1994 | Smith et al. |
| 5,399,591 A | 3/1995 | Smith et al. |
| 5,408,019 A | 4/1995 | Mertens et al. |

OTHER PUBLICATIONS

Mark & Odian, "Polymer Chemistry", ACS, Washington, D.C., 1992, p. 5.

Fredric L. Buchholz, "Recent Advances in Superabsorbent Polyacrylates", TRIP vol. 2. No. 8, Aug. 1994, pp. 277–281.

WATER ABSORBING POLYMER

This application is a continuation application of U.S. Ser. No. 08/973,574, filed Mar. 9, 1998 now U.S. Pat. No. 6,291,605 which is a national stage application under 35 U.S.C. Sec. 371 of Freeman et al. PCT/US96/09132 entitled "A Polymerization Process, Apparatus and Polymer", filed Jun. 6, 1996, which is a continuation-in-part application of U.S. Ser. No. 08/486,079, entitled "A Polymer Produced By A Radical Polymerization Process", filed Jun. 7, 1995, now abandoned, which is a continuation-in-part of U.S. Ser. No. 07/855,458, entitled "Method and Apparatus of Continuous Production of Water-Absorbing Polymeric Spheres and the Product Thereof", filed Mar. 19, 1992, now abandoned, which is a continuation of U.S. Ser. No. 07/534,177, entitled "Method and Apparatus for Continuous Production of Water-Absorbing Polymeric Spheres and the Product Thereof", filed Jun. 6, 1990, now abandoned.

BACKGROUND OF THE INVENTION

The present invention relates to a spray polymerization process, an apparatus for producing a dry polymer and a polymer having novel physical characteristics. Particularly, the present invention relates to a polymerization process for the continuous production in a controlled atmosphere of a substantially dry polymer particle powder comprising polymer particles of desired size, shape and density from a liquid monomer source.

It is known in the art that polymers may be synthesized by step polymerization and chain polymerization processes. Chain polymerization is initiated by a reactive species produced by a compound or compounds referred to as an initiator. Generally, monomers show varying degrees of selectivity with regard to the type of reactive center that will cause chain polymerization. Monomers show high selectivity between anionic and cationic initiators, however, most monomers will undergo polymerization with a radical initiator, although at varying rates. Examples of the types of monomers which will polymerize to high molecular weight polymers in the presence of a radical initiator include: ethylene; 1,3-dienes; styrene; halogenated olefins; vinyl esters; acrylates; methacrylates; acrylonitrile; methacrylonitrile; acrylamide; methacrylamide; N-vinyl carbazole; N-vinyl pyrrolidone.

Essentially, radical polymerization conditions are either homogenous or heterogeneous, depending upon whether the initial reaction mixture is homogenous or heterogeneous. Some homogeneous systems however, may become heterogeneous as polymerization proceeds due to the insolubility of the polymer in the reaction media. Generally, mass and solution polymerizations are homogeneous processes, while suspension and emulsion polymerizations are heterogeneous processes. All monomers can be polymerized by any of the various processes however, it is usually found that for commercial considerations the polymerization of a particular monomer is best carried out by one or two of the processes.

Bulk or mass polymerization of a pure monomer offers the simplest process with a minimum of contamination of the product. Bulk polymerization, however, is difficult to control due to the characteristics of radical chain polymerization. The bulk process is highly exothermic, high activation energies are involved, and there is a tendency toward the gel effect. Such characteristics make the dissipation of heat difficult, therefor, careful temperature control is required during bulk polymerization processes. Additionally, the viscosity of the reaction system increases rapidly at a relatively low conversion, thereby requiring the use of elaborate stirring equipment. Localized "hot spots" may occur which damage, degrade and discolor the polymer product, and a broadened molecular weight distribution may result due to chain transfer between polymer molecules. There is also the risk in extreme cases that an uncontrolled acceleration of the polymerization rate can lead to disastrous runaway-type reactions.

Many of the disadvantages of bulk polymerization may be overcome by polymerizing a monomer in a solvent (solution polymerization). The solvent, which may be water, acts as a diluent and aids in the transfer of the heat of polymerization. The solvent can be easily stirred since the viscosity of the reaction mixture is decreased. Although thermal control of a solution polymerization process is easier than with mass or bulk polymerization, the purity of the polymer may be affected if there are difficulties in removing the solvent during and following polymerization.

Heterogeneous polymerization is used extensively to control the thermal viscosity problems often associated with homogeneous processes. Precipitation polymerization is a heterogeneous polymerization process which begins as a homogeneous polymerization but converts to heterogeneous polymerization. A monomer either in bulk or in solution (usually aqueous but sometimes organic) forms an insoluble polymer in the reaction medium. Precipitation polymerization can be referred to as powder or granular polymerizations because of the forms in which the final polymer products are obtained. The initiators used in precipitation polymerization are soluble in the initial reaction medium and polymerization proceeds following absorption of monomer into the polymer particles.

Suspension polymerization, also referred to as bead or pearl polymerization, is carried out by suspending the monomer (discontinuous phase) as droplets (50 to 500 $\mu$m in diameter) in water (continuous phase). The ratio of water to monomer typically will vary from about 1:1 to 4:1 in most polymerizations. The monomer droplets which are subsequently converted to polymer particles do not coalesce due to agitation and the presence of suspension stabilizers also referred to as dispersants or surfactants. Stabilizers may be water soluble polymers or water insoluble inorganic powders. The suspension stabilizers are used typically in an amount that is less than 0.1 weight percent of the aqueous phase. The two-phase suspension system cannot be maintained in suspension polymerization without agitation.

Suspension polymerization initiators are soluble in the monomer droplets and are referred to as oil-soluble initiators. Suspension polymerization in the presence of high concentrations of water soluble stabilizers are used to produce latex-like dispersions of particles having small particle size. Such suspension polymerizations may be referred to as dispersion polymerizations. Inverse microsuspension polymerization involves an organic solvent as a continuous phase of a water soluble monomer either neat or dissolved in water. Inverse dispersion refers to systems involving the organic solvent as continuous phase with dissolved monomer initiator that yield insoluble polymer.

Emulsion polymerization involves the polymerization of monomers in the form of emulsions, i.e., colloidal dispersions. Emulsion polymerization differs from suspension polymerization in the type and smaller size of the particles in which polymerization occurs, in the kind of initiator employed, and in the dependence of polymer molecular weight on reaction parameters. For most polymerization processes there is an inverse relationship between the polymerization rate and the polymer molecular weight. Large decreases in the molecular weight of a polymer can be made without altering the polymerization rate by using chain transfer agents. Large increases in molecular weight can be made only by decreasing the polymerization rate, by lowering the initiator concentration, or lowering the reaction temperature.

Emulsion polymerization allows increasing the polymer molecular weight without decreasing the polymerization rate. Emulsion polymerization has the advantage of being able to simultaneously obtain both high molecular weights and high reaction rates. The dispersing medium is usually water in which the various components are dispersed by means of an emulsifier. Other components include the monomer, a dispersing medium and a water soluble initiator. Surfactants are typically used in emulsion polymerizations at from 1 to 5% weight. The ratio of water to monomer is generally in the range 70/30 to 40/60 by weight.

The polymerization processes discussed above involve additional steps either to dry the polymer formed, separate the polymer from the organic solvent used in the process, or to recover the organic solvent. The added steps require additional energy and time in preparing the final product, thereby increasing the cost of the polymer produced. Moreover, the polymers produced using these known processes typically are produced as an agglomeration which must, following drying, be pulverized or in some way broken up to yield a usable polymer product. Breaking up the polymer product by grinding or pulverizing produces a substantial amount of dust which raises environmental and health concerns to those having to work in and around the polymer dust.

Therefore, there remains a need for a polymerization process and an apparatus in which to carry out the process which will enable the production of a dry polymer particle powder, thus eliminating the need to dry and pulverize the polymer product produced. There is also a need for a polymerization process for producing polymers which are immediately available for use following the completion of the polymerization process.

Finally, there is a need for a process to produce a polymer which allows the size, shape, and density of the polymer to be controlled easily and precisely. This is particularly important, for example, with polymers used in situations where a smooth surface is beneficial, such as in fiber optic cables. Fiber optic cables, which are becoming more common in telecommunications, are susceptible to invasive water. However, the use of super-absorbing polymers in fiber optic cables is problematical because of the relatively "soft" cladding around each fiber. The "softness" of the cladding makes it prone to scratching, which alters the refractive index of the cladding, and therefore, the ability of the fiber to conduct light. Experimentation has shown that superabsorbers produced by known processes cause very fine scratching of the cladding, an effect which is attributed to the rough surfaces of the polymer particles resulting from the pulverization, grinding, or chopping of the solid cross-linked polymer resulting from the above-described production methods into a fine powder as described above. The scratches in the surface of the cladding occur whenever the fiber optic cable is flexed, e.g., when the cable is wound on a spool and then wound off the spool for installation.

Polymerization processes frequently require that polymerization take place on substrate or on a nucleating particle of some kind. For example, U.S. Pat. No. 4,135,043 discloses a process for manufacturing hydrophilic polymers. A previously formed polymer is coated with similar type monomers to form a coating on the polymer seed. Thereafter, the coated seed is heated in order to polymerize the coating thereon. Processes of this type also require that the additional production steps discussed above be employed.

Exemplary of the shortcomings of current polymerization processes are the known methods for the production of water-absorbing polymers. Such methods can be categorized as involving either an aqueous system or a multi-phase process. Aqueous systems for production of such polymers generally result in a semi-solid mass of material from which water must be removed in an energy-intensive drying step. For instance, in U.S. Pat. No. 4,295,987, the mixture of polymerized monomers must be dehydrated with excess methanol to form a firm solid that is dried in, for instance, a vacuum oven, and then ground into particles of a desired size or into a powder.

Also known are methods for continuous production of such polymers in an aqueous system as illustrated by the description set out in U.S. Pat. No. 4,525,527, hereby incorporated in its entirety by this specific reference thereto. Briefly, that patent describes the heating of an aqueous monomer solution to which an initiator is added by pouring the initiator onto the mixture as the mixture flows onto a traveling conveyer belt. The polymerization is exothermic, helping to drive off the water, and results in a "relatively dry, solid polymer of low water content", said to be 8–15% water. The solid polymer is then made into a powder by pulverization.

Multi-phase processes involve polymerization of an aqueous reaction mixture in an inert organic solvent, followed by the removal of the solvent from the polymerized product. So far as is known, such processes are batch processes, and a representative example process in U.S. Pat. No. 4,446,261, hereby incorporated in its entirety by this specific reference thereto. That patent describes the preparation of polymer beads by suspension of an aqueous solution monomer and crosslinker in a hydrocarbon or halogenated aromatic hydrocarbon and polymerization of the monomer upon addition of a water soluble initiator. As described in that patent, the hydrocarbon is removed by distillation under reduced pressure and the residual polymer particles dried by heating under reduced pressure.

Other examples of such processes are found in the following U.S. patents:

| AQUEOUS | | | |
|---|---|---|---|
| 3,661,815 | 3,669,103 | 4,071,650 | 4,167,464 |
| 4,286,082 | 4,295,987 | 4,342,858 | 4,351,922 |
| 4,389,513 | 4,401,795 | 4,525,527 | 4,552,938 |
| 4,612,250 | 4,618,631 | 4,654,393 | 4,703,067 |
| MULTI-PHASE | | | |
| 4,059,552 | 4,093,776 | 4,340,706 | 4,446,261 |
| 4,459,396 | 4,666,975 | | |
| AQUEOUS/MULTI-PHASE | | | |
| 4,062,817 | 4,654,039 | | |

Both types of processes are characterized by a number of disadvantages which add to the cost of producing such polymers such that there is a need for an improved method for producing these and other polymers. For instance, both aqueous and multi-phase batch processes require drying of the polymer.

Another disadvantage to producing polymers by known polymerization methods, particularly with respect to water-absorbing polymers, is the difficulty often experienced in controlling the size, shape, and density of the polymers produced. For example, water-absorbing polymer particles with a smooth external surface are, so far as is known by Applicants, are previously unknown. It appears that at least some multi-phase methods for production of such polymers result in spherical (see, for instance, column 5, lines 39, 48 and 60 of the above-incorporated U.S. Pat. No. 4,446,261) or donut-shaped (see column 6, line 57 of the above-incorporated U.S. Pat. No. 4,342,858) particles, but Applicants have been unable to find any such particles which have a smooth surface. Instead, all known particles are characterized by either a rough surface or by a surface such as that described in the above-listed U.S. Pat. No. 4,342,858 (column 6, lines 56–58) as being "high surface area donuts of collapsed spherical shapes with 2 to 5 micron protuberances on their surfaces".

Some additional disadvantages are characterized at, for instance, column 2, lines 56 et seq. of U.S. Pat. No. 4,093,776 and column 1, lines 18–56 of U.S. Pat. No. 4,625,001, both hereby incorporated in their entirety by this separate reference thereto.

It is, therefore, an object of the present invention to provide a novel polymer in which the size, shape and density of the polymer can be easily and precisely controlled, and a process and apparatus for doing so.

It is another object of the present invention to provide a novel polymer in which the degree of crosslinking and the water content of the resulting particle can be conveniently and precisely controlled, and a process and apparatus for doing so.

It is an object of the present invention to provide a novel polymer which is not formed on a substrate or other precursor which acts as a seed or nucleus for the polymer formation, and a process and apparatus for doing so.

It is an object of the present invention to provide a process and apparatus for producing a polymer which eliminates the difficulty inherent in the handling of the highly viscous solution, gel, or cake resulting from the production of such polymers with known processes.

It is another object of the present invention to eliminate the necessary grinding, pulverization, and/or chopping of a semi-solid mass of polymer which characterizes known processes for making polymers.

It is another object of the present invention to eliminate the costly step of recovering the organic solvent or medium used in known processes for the production of polymers.

Another object of the present invention is to provide a process and apparatus for producing a polymer which eliminates the costly drying step of many known processes for producing polymers.

It is an object of the present invention to provide a polymerization process which allows the polymerization reaction, polymer particle size, polymer particle shape, and water content of the polymer particle powder produced to be easily controlled.

It is an object of the present invention to provide a process and apparatus for using a fluid source of a selected monomer to produce a substantially dry polymer particle powder.

Other objects, and the advantages, of the present invention will be made clear to those skilled in the art from a review of the following detailed description of the presently preferred embodiments thereof.

SUMMARY OF THE INVENTION

An atmospheric chain polymerization process is provided. The process comprises preparing a first mixture of at least one monomer source and a solvent selected from the group consisting of water, organic solvents and mixtures thereof, and adding an initiator source to the first mixture to form a second mixture of polymerization reagents A crosslinker, neutralizer, or other reagents may also be added to the first mixture. The mixture of polymerization reagents is sprayed into a heated, controlled atmosphere. The heated, controlled atmosphere is maintained in a closed vessel, such as a reaction chamber. Spraying the mixture results in the formation of droplets which experience free fall through the heated, controlled atmosphere for a sufficient period of time to obtain a desired degree of polymerization. The solvent is continuously evacuated from the atmosphere during the polymerization process.

It is preferred that the mixture of polymerization reagents is sprayed into the chamber at the top section of the chamber. It is also preferred that the reaction chamber is about 3.65 to about 30.48 meters in height. Preferably, the pressure in the reaction chamber is maintained at less than ambient atmospheric pressure. Desired pressure levels include from about 338.6 to about 50,790 $N/m^2$ below ambient atmospheric pressure. Further, it is preferred that the reaction chamber is heated to a temperature of from about 23.8° C. to about 148.8° C. during the polymerization reaction.

It is further preferred that the first mixture is maintained at a desired temperature and pressure prior to adding the initiator source. It is also preferred that the second mixture is maintained at a temperature of between about 26.60 and about 93.3° C.

In the preferred embodiment of the process, the second mixture of reagents is sprayed into the atmosphere through one or more nozzles. A substantially dry polymer particle powder is produced by the polymerization reaction. Polymer particle is defined herein as a substantially dry powder-like product. Substantially dry means that the particles will not agglomerate or stick together, and the powder is free flowing. The present process enables the production of polymers from about 20 microns to about 125,000 microns in size. However, polymer size, shape, and density in a powder will be fairly uniform when prepared under similar pressure, temperature, and the other parameters which will be more fully discussed in the Detailed Description of the Invention.

The size of the polymer particle produced may be varied by increasing or decreasing the size of the nozzle opening. In the preferred process the mixture of polymerization reagents is sprayed into the heated, controlled atmosphere at a pressure of between about 517 KPa and about 13.7 MPa. The dry polymer particle powder may be recovered while maintaining a heated, controlled atmosphere.

The monomer source may be an aqueous solution, slurry, or emulsion of a selected monomer. The preferred solvent is water. Similarly, the crosslinker source may be an aqueous solution, slurry, or emulsion of a selected crosslinker and the solvent is water.

Monomer sources which may be polymerized using the process include unfunctionalized olefins and functionalized olefins, including but not limited to acrylic acid, ethylenes, dienes, styrenes, propylenes, vinyls, methacrylates, acrylonitrile, methacrylonitrile, acrylamide, methacrylamide, and alkenes.

A polymerization process is also provided for producing an acrylic acid containing polymer. The process comprises the steps of preparing an aqueous mixture of partially neutralized acrylic acid, adding a polymerization initiator to the aqueous mixture to form a second mixture of polymerization reagents, and spraying said second mixture into a heated, controlled atmosphere. The spraying of the mixture results in the formation of droplets of said second mixture which are allowed to fall through the heated, controlled atmosphere for a sufficient period of time to obtain a desired degree of polymerization and thus form a partially neutralized acrylic acid containing polymer in particle powder form.

Polymers produced according to the process are also provided.

A radical polymerization apparatus is provided. The apparatus comprises a reaction chamber, a means for heating the reaction chamber, preferably from about 3.65 to about 30.48 meters in height, a means for controlling the pressure within said reaction chamber, one or more nozzles connected to a feed line for receiving a mixture of a monomer source and an initiator source, and a means for spraying the mixture into the top section of the reaction chamber. spraying the mixture into the chamber results in the formation of droplets which fall through the reaction chamber for a sufficient period of time to obtain a desired degree of polymerization. It is preferred that the mixture is sprayed into the reaction chamber at from about 517 KPa to about 13.7 MPa of pressure.

Preferably, the pressure in the reaction chamber is maintained at less than ambient pressure. Desired pressure levels include from about 338.6 to about 50,790 $N/m^2$ below ambient atmospheric pressure. Further, it is preferred that the reaction chamber is heated to a temperature of from about 23.8° C. to about 148.8° C. during the polymerization reaction.

The apparatus may further comprise a means for removing the polymer from the bottom of said reaction chamber while maintaining the heat and the pressure within the chamber. The means for removing the polymer may comprise a trough located in the bottom of the reaction chamber, a first auger mounted in the bottom of the trough for moving the polymer out of the chamber, a bin into which the first auger deposits the polymer and a second auger mounted in the bottom of the bin for moving the polymer out of the bin.

It is preferred that the apparatus further comprises a means for controlling the temperature of the monomer and initiator mixture in the feed line. It is also preferred that the apparatus includes a means for mixing the monomer and initiator before it is sprayed into the chamber.

Means are also provided for removing unpolymerized monomer in a vapor state from said reaction chamber by purging the reaction chamber with nitrogen. Separate reservoirs are provided for the monomer source and the initiator source. Reservoirs may also be provided for a crosslinker source, and other reagents. When it is desired that crosslinked polymer structures be produced, crosslinker is added to the mixture of monomer source and initiator source prior to the mixture being sprayed into the reaction chamber.

Polymers produced using the apparatus may be polymerized from unfunctionalized olefins and functionalized olefins, including but not limited to acrylic Acid, ethylenes, dienes, styrenes, propylenes, vinyls, methacrylates, acrylonitrile, methacrylonitrile, acrylamide, methacrylamide, and alkenes.

A polymer is produced by a radical polymerization process comprising the steps of preparing a first mixture of at least one monomer source and a solvent selected from the group consisting essentially of water and organic solvents, adding an initiator source to the first mixture to form a second mixture of polymerization reagents, then spraying the second mixture of reagents into a heated, controlled atmosphere. The heated, controlled atmosphere is maintained in a closed vessel or reaction chamber which is preferably about 3.65 to about 30.48 meters in height. Preferably, the second mixture is sprayed in at the top section of the vessel.

It is preferred that the first mixture is maintained at a desired temperature and pressure prior to adding the initiator source. It is also preferred that the second mixture is maintained at a temperature of between about 26.6° C. and about 93.3° C. The spraying of the second mixture of reagents into the atmosphere through one or more nozzles results in the formation of droplets which are allowed to fall through the heated, controlled atmosphere for a sufficient period of time to obtain a desired degree of polymerization. The solvent and unpolymerized monomer is continuously evacuated from the atmosphere during the polymerization process. The polymer produced is in dry particle powder form and is recovered from the vessel while maintaining a heated, controlled atmosphere. The polymers may range in size from about 2 to about 125, 000 microns in size. The size of the polymer particle produced can be varied by increasing or decreasing the size of the nozzle opening. It is preferred that the second mixture of polymerization reagents be sprayed into the heated, controlled atmosphere at a pressure of between about 517 KPa and about 13.7 MPa.

In a preferred embodiment, the atmosphere is maintained at a temperature of from about 23.8° C. to about 148.8° C. It is also preferred that the controlled atmosphere is at reduced pressure maintained at a pressure of from about 338.6 to about 50,790 $N/m^2$ below ambient atmospheric pressure.

When desired to produce crosslinked polymer structures, a crosslinker may be added to the first mixture. A neutralizer may also be added to the first mixture. The monomer source may be a water-soluble, unsaturated monomer which, when a crosslinker is added to the polymerization mixture of reagents, results in a water-absorbing polymer being produced.

The monomer source may be an aqueous solution, slurry, or emulsion of a selected monomer. The preferred solvent is water. Similarly, the crosslinker source may be an aqueous solution, slurry, or emulsion of a selected crosslinker and the solvent is water.

The monomer source may be unfunctionalized olefins or functionalized olefins, including but not limited to acrylic acid, or selected from the group of compounds consisting essentially of ethylenes, dienes, styrenes, propylenes, vinyls, esters, acrylates, methacrylates, acrylonitrile, methacrylonitrile, acrylamide, methacrylamide, and alkenes.

An acrylic acid containing polymer is produced by an aqueous radical polymerization process comprising the steps of preparing an aqueous mixture of acrylic acid, adding a polymerization initiator to the aqueous mixture to form a second mixture of polymerization reagents, and spraying the second mixture into a heated, controlled atmosphere. Spraying results in the formation of droplets of the second mixture. The droplets of the sprayed second mixture are allowed to fall through the heated, controlled atmosphere for a sufficient period of time to obtain a desired degree of polymerization and thus form an acrylic acid containing polymer in particle powder form. The polymer produced is a water-absorbing polymer in substantially dry powder form and has, for example, a particle size of less than approximately 100 microns.

An unexpected advantage of producing polymers in accordance with the present invention is the production of a particle having a smooth external surface, making possible certain new uses for such polymers, particularly water-absorbing polymers. For instance, known water absorbing polymers may be used to advantage in telecommunications cables for the purpose of protecting the conductors from shorts caused by invasive water.

DETAILED DESCRIPTION OF THE INVENTION

Figure 1:
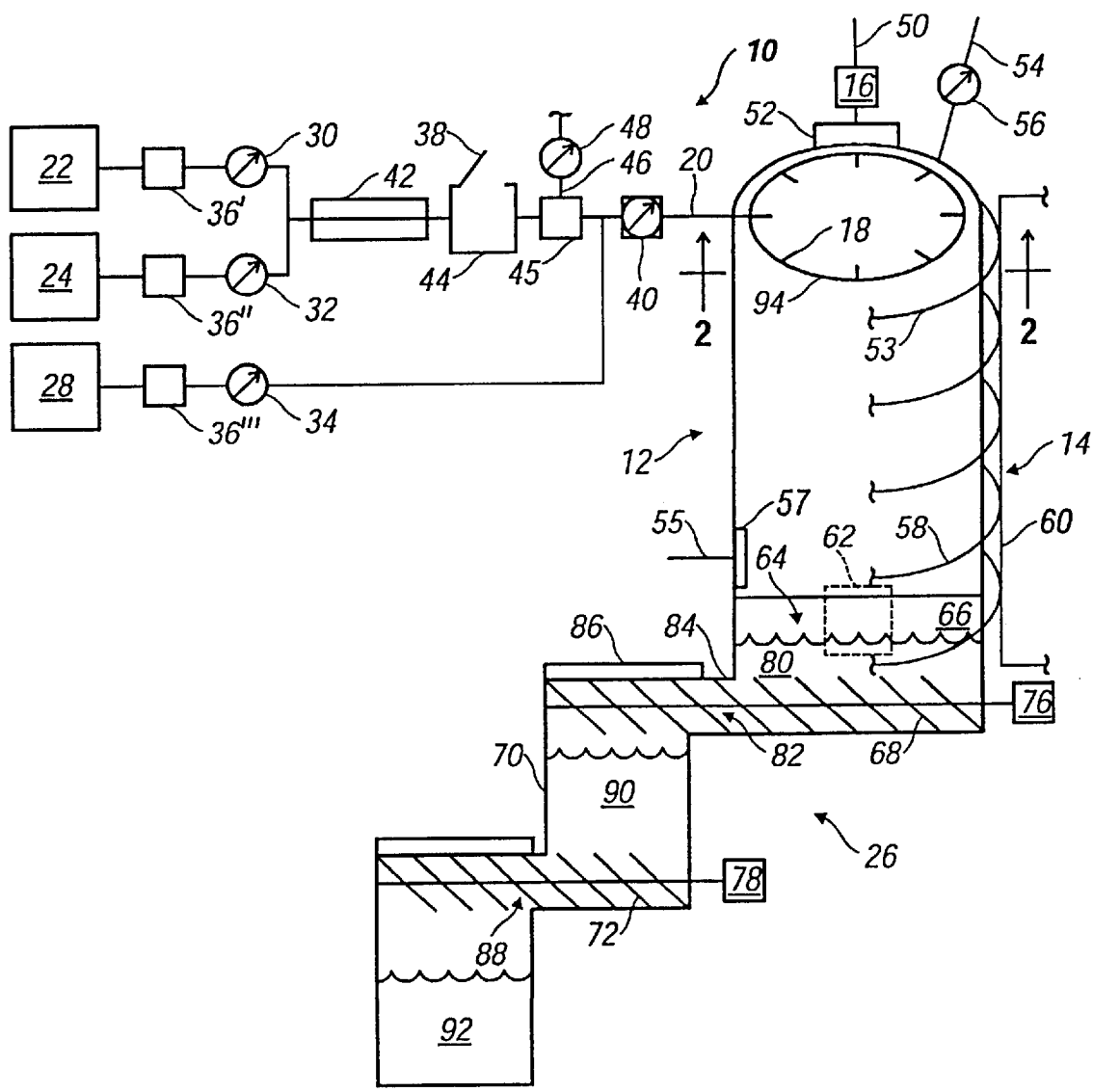
FIG. 1 is a schematic representation of an apparatus constructed in accordance with the present invention.

Referring first to FIG. 1, there is shown an apparatus constructed in accordance with the present invention designated generally at reference numeral 10. Briefly, the apparatus 10 is comprised of a reaction chamber or other closed vessel 12, means for heating the reaction chamber 12, shown schematically at reference numeral 14, means for reducing the pressure in reaction chamber 12 in the form of the vacuum pump 16, nozzle 18 connected to a feed line 20 for receiving a mixture of a monomer and an initiator from the respective sources 22 and 28 thereof, and means, in the form of the bins and auger system indicated generally at reference numeral 26, for removing the dry polymer particle powder produced in reaction chamber 12 from the bottom thereof while maintaining reduced pressure in the reaction chamber 12. Reaction chamber 12 will preferably be about 3.65 to about 30.48 meters in height.

In more detail, the apparatus 10 includes sources, or reservoirs, of monomers 22, initiator 28, and a third reservoir 24 preferably comprising a source of a crosslinker. A crosslinker or combination of crosslinkers will be added to the monomer and initiator mixture when. it is desirable to produce crosslinked polymer structures, such as water-absorbing acrylic family polymers. Other reservoirs (not shown), each preferably individually temperature controlled, are provided for other monomers (for co-polymerization processes), water, neutralizer, stabilizer, transfer agent, solvent, or other reagents.

Each of the reservoirs 22, 24 and 28 may contain an aqueous and/or organic solvent-based solution, suspension, or emulsion of the respective reagent and therefore is preferably provided with valves 30, 32 and 34, respectively, for controlling the flow of the respective reagents therefrom under the influence of the pumps 36. Alternatively, feed line 20 is pressure fed from the respective reservoirs 22, 24 and 28. Feed line 20 is provided with means., indicated generally at reference numeral 44, for mixing the aqueous and/or organic solvent-based mixture of reagents. to insure uniform distribution between monomer, initiator, and other reagents of the polymerization mixture. Mixing means 44 takes a number of forms known in the art such as an in-line screw or auger, mill, vat with stirring blades, or baffle system. Also provided is a hatch 38 in the housing of mixing means for adding any other types of reagents.

Because the polymerization of the monomer begins almost instantaneously upon the mixing of the initiator and monomer and proceeds rapidly in an exothermic reaction, the temperature of the mixture in feed line 20 is used to control the degree of polymerization of the monomer and, when crosslinkers are added, the degree of crosslinking of the polymer structure (note that FIG. 1 is not drawn to scale). To that end, a means is provided for controlling the temperature of the mixture in feed line 20 which is shown schematically at reference numeral 42. Temperature control means 42 may take the form of a water bath, refrigeration coils, insulation, a combination of heating elements and refrigeration coils, or any other means known for controlling temperature, depending upon the nature of the monomer(s) being polymerized and/or crosslinked. Means 42 is used primarily to reduce the heat resulting from the exothermic polymerization reaction. Lowering the temperature of the reagent mixture in line 20 prevents the polymerization rate of the monomer source.

In a preferred embodiment, line 20 is provided with a nitrogen pure chamber 45 fed by a line 46 having a valve 48 therein for a flow of nitrogen to purge the mixture of reagents flowing therethrough. A metered pump 40 in feed line 20 provides control over the pressure and rate of flow of the mixture of reagents.

The pressure of the atmosphere in reaction chamber 12 is controlled during the polymerization reaction. The pressure of the atmosphere in reaction chamber 12 may be reduced relative to the ambient pressure by vacuum pump 16, the atmosphere therein being removed from reaction chamber 12 through line 50. A filter 52 is provided at the intake of line 50 to prevent droplets/particles of polymerized monomer from being pulled into vacuum pump 16. Filter 52 is preferably set in a frame accessible from the exterior of reaction chamber 12 to facilitate periodic changing of the filter element (not shown).

The pressure of the atmosphere in reaction chamber 12 may also be increased above ambient atmospheric pressure in order to produce a polymer particle of a more dense construction than is produced at below atmospheric pressure.

An air intake or vent line 54 having a flow control valve 56 therein is provided at the top of reaction chamber 12 for allowing ambient air into reaction chamber 12 to purge line 50 and pump 16 and/or in the event of an emergency shutdown. Instead of using air intake line 54 as a vent, nitrogen can also be introduced into the atmosphere in reaction chamber 12 through line 54 to purge the atmosphere therein, in which case, a purge line 55 is provided for recapturing the nitrogen. Again, a filter 57 prevents polymer particles from being pulled into line 55. Reaction chamber 12 is also provided with means 62, in the form of a clean-out hatch, for removing unpolymerized monomer, or, in the event of a malfunction of particle removing means 26, the dry polymerized particles, from the bottom thereof. Heater 14 may be multiple resistive heating elements, gas burners, or steam lines, indicated schematically at reference numeral 58, powered from a common line 60 from a source of electricity, steam, or gas (not shown).

Means 26 is provided for removing the polymer from the bottom of reaction chamber 12 while maintaining the heat and atmosphere therein. Means 26 may be any of the devices known to those skilled in the art. For example, as shown in FIG. 1, a V-shaped trough 64 is formed from two sloping sides 66 which form the bottom of reaction chamber 12. A first auger, screw, or other continuous conveyer system 68 is mounted in the bottom thereof for moving the particles of polymer out of reaction chamber 12 for deposit into a bin 70. Bin 70 is provided with a second auger, screw, or other continuous conveyer system 72 mounted in the bottom thereof for moving the polymer deposited therein by first auger 68 out of bin 70 into a hopper, bag or other storage/collection container 74. The respective augers 68 and 72 are driven by motors 76 and 78 or by a single motor and belt pulley system (not shown).

The accumulated dry polymer particles 80 in the bottom of tower 12 cover the portal 82 out of the bottom reaction chamber 12 to maintain the reduced pressure therein as first auger 68 moves the accumulated polymer particles 80 into bin 70. A shroud 84 covers first auger between reaction chamber 12 and bin 70 to prevent the influx of ambient air into reaction chamber 12 and bin 70 is closed by a lid 86 at the top thereof. A portal 88 in the bottom of bin 70 allows the accumulated polymer particles in bin 70 to be moved out of bin 70 into hopper 74. In the same manner that the accumulated polymer particles 80 cover the portal 82 in the bottom of reaction chamber 12, accumulated polymer particles 90 cover the portal 88 in the bottom of bin 70 to prevent an influx of ambient air therethrough.

As will be explained below, the conditions under which polymerization and crosslinking occur are such that the particles of polymer 80 which accumulate at the bottom of reaction chamber 12 are substantially dry and have a low moisture content, and in light of the ability of some polymers to absorb moisture, preventing access to the accumulated polymer 80 by relatively humid ambient air is necessary to preventing the caking of the dry, accumulated polymer 80 as it is moved out of reaction chamber 12. Those skilled in the art who have the benefit of the disclosure will recognize that other means can be utilized to remove the dry accumulated polymer 80 from the bottom of reaction chamber 12 without breaking the vacuum therein. For instance, commercially available gravity feed, intermittent dump, and suction devices are all used to advantage for this purpose.

Figure 2:
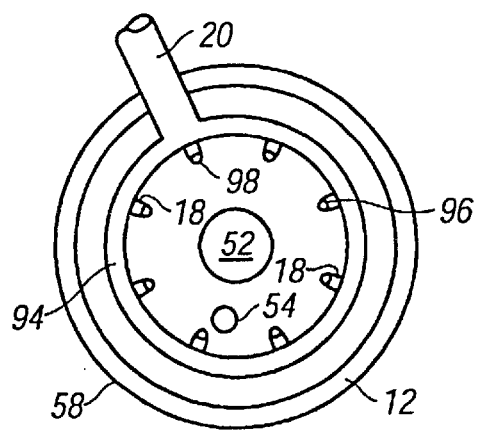
FIG. 2 is a sectional view, taken along the lines 2'2 in FIG. 1, of the apparatus of FIG. 1.

As shown in FIG. 2, feed line 20 enters reaction chamber 12 and terminates in a loop 94 having a plurality of nozzles 18 set therein. Alternatively, a single nozzle may be used. Nozzles 18 are preferably screwed into the threads 96 formed at intervals around the loop 94 for ease in removing nozzles 18 for cleaning and/or changing. In another preferred embodiment (not shown), the loop 94 in feed line 20 is positioned outside of the top of tower 12. The latter embodiment is particularly advantageous for frequent changing of nozzles 18 to, for instance, change the diameter of the polymeric spheres.

If larger diameter particles are desired, the mixture in line 20 is sprayed into reaction chamber 12 at relatively low pressure, e.g., about 517 KPa to about 2.06 MPa through nozzles 18 having a larger diameter orifice, for instance, a number 16 nozzle. If it is desired to produce a smaller diameter sphere, the pressure in line 20 is increased with pump 40, e.g., from about 1.03 MPa on up to as high as perhaps 13.7 MPa, causing the mixture to be atomized into finer sized particles. If even smaller particles are desired, or if it is desired to produce smaller diameter particles at lower spray pressures, nozzles 18 are replaced with nozzles having smaller orifices, e.g., a number 64 nozzle.

With reference to the figures, the method of continuously producing a polymer in accordance with the present invention will now be explained. The method comprises the mixing of the monomer source in water or organic solvent in mixer 44 to prepare a liquid monomer source. Alternatively, liquid monomer sources may be obtained from sources known to those skilled in the art. It is preferred that the monomer be an aqueous monomer source. An initiator, crosslinker, additional water, neutralizer and/or other reagents may be added to the monomer source in mixer 44. In the preferred embodiment of the process, the monomer, initiator, and other reagents used will be soluble in water or the organic solvent used to prepare the liquid monomer source. It is preferred, however, that the monomer, initiator and other reagents are soluble in water. Initiator sources suitable for use with selected monomers will be known to those skilled in the art.

It is preferred that the initiator is added downstream from the monomer source immediately prior to the mixture being sprayed into the reaction chamber 12 to reduce the likelihood that line 20 or nozzles 18 will become clogged by prepolymerization of the monomers. Although it is preferred that an initiator be added to the monomer source, some monomers may undergo self-initiated polymerization, thus eliminating the need for an initiator. However, the rate and extent of polymerization is facilitated by the use of an initiator.

Note that it may be advantageous to agitate or otherwise insure adequate mixing of initiator and aqueous mixture by use of a second mixing means (not shown) similar to mixing means 44 downstream of the point at which the initiator is added to line 20.

Reaction chamber 12 is heated by heater 14 and the pressure of the atmosphere is controlled according to the monomer source being polymerized. Desired pressures at which to cause polymerization of selected monomers will be known to those skilled in the art. The atmosphere is maintained at a reduced pressure by vacuum pump 16. The atmosphere may be controlled at a positive pressure by use of a pressure release valve in conjunction with the pressure evacuation pump. However, a positive pressure may be established by a pressure pump or other means known to those in the art in the chamber prior to spraying in the mixture.

The mixture of monomers and/or reagents is sprayed into the heated, controlled atmosphere, thereby forming droplets of the mixture. The droplets are allowed to fall through the reaction chamber for a period of time sufficient to allow the desired degree of polymerization of the monomers, and where a crosslinker has been added, crosslinking of the polymerized monomer, to form particles of polymer. The polymer particles formed may be linear, branched or crosslinked polymers, depending upon the composition of the sprayed mixture.

As the droplets of the mixture of monomers and/or reagents fall from the spray nozzle through the chamber, water and/or solvents associated with the polymerization mixture are continually evaporated or volatilized as the polymerization reaction occurs. In the presence of the preferred reduced pressure within chamber 12, water and/or solvent associated with the mixture is continually evaporated or volatilized due to both the presence of heat and the reduced pressure. Vapors are evacuated by vacuum pump 16 during the polymerization action. Alternatively, in the presence of positive pressure within chamber 12, the water and/or solvent associated with the mixture is evaporated due to the heat within the chamber.

The polymer particles produced as a result of the polymerization process are in the form of a substantially dry powder 80. The polymers produced in dry particle form by this process may have a particle size from as small as approximately 2 microns up to as large as about 125,000 microns (approximately ⅛ inch). The size of the polymer will depend upon the pressure, temperatures, and other parameters discussed more fully below which are present and/or utilized during the polymerization process. The polymer size, shape, and density, however, will be relatively uniform when produced under similar conditions. The fallen particles of polymer 80 which collect at the bottom of reaction chamber 12 are removed while continuing to control the pressure within the chamber. The atmosphere will be maintained at the pressure desired for the selected polymerization desired as the polymer is removed.

In a particularly preferred embodiment, the method of the present invention additionally comprises allowing sufficient fallen particles of polymer 80 to accumulate at the bottom of reaction chamber 12. The accumulated polymer particles form a large enough mass of heated particles to decrease the amount of energy required to maintain the temperature of the atmosphere within reaction chamber 12 at a desired temperature.

It is preferred that the atmosphere in reaction chamber 12 be heated to a temperature of between about 23.8° C. and about 148.80° C. Temperatures of between about 82.20° C. and about 110° C. have been found to be particularly preferred. Although it is possible to make polymers at temperatures below 37.8° C., a larger reduction of the pressure within reaction chamber 12 must be present if low water or solvent content and low residual monomer levels are to be maintained.

The polymerization reaction and, when crosslinker is added to the mixture, crosslinking which occurs as the droplets fall through reaction chamber 12 is exothermic such that relatively little external heat is needed from heater 14 once a desired temperature is reached and the continuous polymerization/crosslinking is underway. Hence, temperatures of well above, for instance, 37.8° C. can be maintained without compromising the efficiency of the method. Further adding to the efficiency of the method of the present invention is the heat retention of the accumulated mass of particles 80 at the bottom of reaction chamber 12.

The pressure of the atmosphere inside reaction chamber 12 need not be reduced below or raised above ambient atmospheric pressure to produce polymers. However, even relatively minor reductions in the pressure below nominal ambient pressure of about 101,580 N/m² cause disproportionate decreases in the water content of the polymers produced and the amount of unpolymerized residual monomer which does not participate in the polymerization and/or cross-linking reaction. For this reason it is preferred that the polymerization process be conducted under reduced pressure conditions in the chamber.

Reductions in pressure of from about 338.6 up to about 50,790 N/m² is preferred for use in connection with the method of the present invention. For a given particle size, the water and/or residual monomer content is directly correlated between the temperature of the atmosphere within reaction chamber 12 and the pressure at which the atmosphere within reaction chamber 12 is maintained. As a general rule, as temperature is increased, the percentage of residual monomer and/or water or solvent content can be maintained at low levels with progressively smaller reductions in pressure relative to ambient pressure. Likewise, as the pressure of the atmosphere in reaction chamber 12 is decreased relative to ambient, low percentages of residual monomer and/or water or solvent content can be maintained with progressively lower temperatures.

Alternatively, the polymerization reaction may be conducted under increased pressure conditions within reaction chamber 12. Increases in pressure within the reaction chamber of from about ambient to about 2 psi may be used to practice the invention. As a general rule, as temperature is increased, the percentage of residual monomer and/or water or solvent content can be maintained at desired low levels with progressively smaller increases in pressure relative to below ambient pressures. Likewise, as the pressure of the atmosphere in reaction chamber 12 is increased relative to ambient, low percentages of residual monomer and/or water or solvent content can be maintained with progressively higher temperatures.

The shape of the polymer is also influenced by the below ambient pressure in the chamber. Varying the pressure allows production of from spherical to more irregular-shaped polymers. At lower below ambient pressures, the polymers will be less uniform in shape and have rougher edges or flake-like appearances. As the reduced pressure approaches ambient, the polymers become more spherical than is observed with polymers produced, for example, at 15 inches of Hg below atmospheric ambient pressure. Increasing the pressure within the chamber enables the production of a smoother, more dense polymer sphere than those produced in low atmospheric pressure conditions.

The period of time required during which the droplets fall through the atmosphere within reaction chamber 12, determine the height of the reaction chamber. As a general rule, fall times of between about 5 and about 60 seconds are required under the preferred conditions of temperature and controlled pressure to achieve the desired degree of polymerization, crosslinking, and evacuation of water/solvent and residual monomer for most monomer/crosslinker mixtures. Experimentation has shown that reaction chamber height must be adequate to allow sufficient reaction chamber fall times in order to achieve the desired extent of polymerization.

The period of time the droplet is allowed to fall through reaction chamber 12 (and hence, the height of that chamber) is also related in part to the diameter of the droplet sprayed from nozzle 18. A nozzle 18 having a large orifice 98 therein produces a larger diameter droplet such that either the reaction chamber fall time of the droplet may be increased, the reduction in the pressure of the atmosphere in reaction chamber 12 may be increased, the temperature may be increased, or some combination of changes in these three parameters may be effected, in order to obtain the desired degree of polymerization, and water/solvent evaporation throughout the resulting particle. In the case of very large diameter droplets, pressure reductions of greater than 67,720 N/m², temperatures of over 101.7° C., and reaction chamber fall times in the 20 second or higher range may be required to allow the desired degree of polymerization and evaporation of liquid.

Another variable affecting the production of polymers in accordance with the method of the present invention is the pressure at which the mixture of monomer and initiator and/or crosslinker is sprayed into the heated, controlled atmosphere in reaction chamber 12. In general, as the pressure at which the mixture is sprayed increases, the size of the droplet decreases, requiring concomitant changes in either reaction chamber fall time, temperature, reduction in pressure in reaction chamber 12, the diameter of the orifice 98 in nozzle 18, or some combination thereof. Satisfactory results have been obtained at spray pressures of between about 517 KPa and about 13.7 MPa, and pressures of between about 698.3 KPa and about 1.20 MPa represent a particularly preferred embodiment of the method of the present invention. The pressure in the line at which the mixture is sprayed, as well as the reduced temperature, prevent the polymerization of monomers prior to their being sprayed into the chamber. Therefore, the combination of decreasing temperature in the feed line, increasing pressure in the feed line and introducing the initiator immediately prior to spraying the mixture into the chamber essentially eliminates any prepolymerization of monomer in the feed line.

A final variable affecting the method of the present invention and the various parameters of pressure, temperature and fall time at which the method is conducted is the nature of the monomer, initiator, crosslinker and other reagents desired to be polymerized. By reference herein to a monomer, it is intended to refer to any organic molecule which is capable of being polymerized by covalent bonding to other organic molecules and/or itself to form chains. Many of the polymers can also be crosslinked. Although it is not intended to limit the method of the present invention to only the following monomers, the following listing will provide an example of certain monomers, including functionalized and/or unfunctionalized olefins, which may be polymerized and in most cases crosslinked in accordance with the method of the present invention:

(a) water-soluble, ethylenically unsaturated monomers as described in the above-incorporated Yamasaki, et al. U.S. Pat. No. 4,446,261: acrylic acid, methacrylic acid, salts of acrylic acid and methacrylic acid, acrylamide, methacrylamide, N-substituted acrylamides, N-substituted methacrylamide, 2-acryloylethane-sulfonic acid, 2-methacryloylethane sulfonic acid, salts of 2-acryloylethane-sulfonic acid and 2-methacryloylethane-sulfonic acid, styrene-sulfonic acid, salts of styrene-sulfonic acid, 2-hydroxyethyl acrylate and 2-hydroxyethylmethacrylate;

(b) the monomers described in Markus, U.S. Pat. No. 2,810,716: acrolein, allylidenediacetate, acrylonitrile, esters of acrylic and methacrylic acid (including methyl methacrylate, ethyl methacrylate, fumaric acid, monomethylfumarate, dimethylfumarate, monoethylfumarte, diethylfumarte, maleic anhydride, maleic acid, monomethylmaleate, dimethylmaleate, monoethylmaleate, diethylmaleate, dimethylmethylenemalonate, diethylmethylene malonate, itaconic acid, monomethylitaconate, dimethyl itaconate, monoethyl itaconate, diethylitaconate, atrophic acid, methyl atropate, and ethyl atropate), chloracrylic acid and esters thereof, bromoacrylic acid and esters thereof, iodoacrylic acid and esters thereof, ortho-, meta-, and paramethylstyrene, fluorostyrene and chlorostyrene, a-sulfoacrylic acid, salts and esters, a-amino-acrylic acid, salts and esters, n-monomethyl and N,N'-dimethyl acrylamide, acrylic and methacrylic anhydride, methylvinylketone, hydroxymethylvinylketone, ortho- and paramethoxystyrene, ethyleneglycol monomaleate, ethylglycol monofumarate, N-vinylmethylacetamide, vinyl acetate, vinyl butyrate, vinyl benzoate, vinylquinoline, and vinylpyridines such as 2-vinylpyridine, 4-vinylpyridine, 2-methyl-5-vinylpyridine, 2-vinyl-5-ethylpyridine, N-vinylpyrrolidone, cyclopentadiene, N-vinylphthalimide, N-vinylsuccinimide, N-vinylacetamide and N-vinyl-diacetamide;

(c) the monomers described in Glavis, et al., U.S. Pat. No. 2,956,046: salts of unsaturated monomeric acids such as quaternary ammonium salts and amine salts thereof and salts of ammonia, alkali metals and alkaline earth metals, including B-hydroxyethyltrimethylammonium acrylate, benzyltrimethyl ammonium acrylate, amine salts, monomethylammonium acrylate, and di- and tri-methylammonium acrylate;

(d) the monomers described in Wichterle, et al., U.S. Pat. No. 3,220,960: dimethylaminoethyl methacrylate, piperidinoethyl methacrylate, morpholinoethyl methacrylate, methacrylylglycolic acid, methacrylic acid, monomethacrylates of glycol, glycerol and ployhydric alcohols, dialkylene glycols and polyalkylene glycols and the corresponding acrylates;

(e) the monomers described in Bashaw, et al., U.S. Pat. No. 3,229,769: cross-linked, substantially water-insoluble, water-swellable sulfonated alkaryl and aromatic polymers such as cross-linked polysodium styrene sulfonate and sulfonated polyvinyltoluene salts, copolymers of such sulfonated alkaryl and aromatic materials with acrylonitriles, alkyl acrylonitriles, acrylates and methacrylates, cross-linked polyvinyl alcohol and polyacrylamide and cross-linked copolymers of polyacrylamide, e.g., of acrylamide and acrylic acid or acrylamide and monovalent salts of acrylic acid, and cross-linked heterocyclic monomers such as polyvinyl morpholinone, poly-5-methyl-N-vinyl-2-oxazolidinone, and polyvinyl pyrrolidene;

(f) the monomers described in Assarsson, U.S. Pat. No. 3,664,343: water-insoluble hydrophilic poly (ethylene oxide) polymers made by subjecting water-soluble poly (ethylene oxide) polymers to ionizing radiation (such polymers are homopolymers of ethylene oxide and copolymers of ethylene oxide with one or more alkylene oxides such as propylene oxide, styrene oxide, and 1,2-butylene, 2,3-butylene and isobutylene oxide, all as described in U.S. Pat. Nos. 3,127,371, 3,214,387, 3,275,998, 3,275,199 and 3,399,149);

(g) the monomers described in Gross, et al., U.S. Pat. No. 3,926,891: alkyl acrylates and methacrylates such as methyl acrylate, ethyl acrylate, propyl acrylate, hexyl acrylate, butyl methacrylate, hexyl methacrylate, octyl methacrylate, decyl methacrylate and omega hydroxy alkyl acrylates such as 2-hydroxyethyl acrylate, hydroxymethyl acrylate, 3-hydroxypropyl acrylate and 4-hydroxybutyl acrylate;

(h) ethylene, 1,3-dienes, styrene, halogenated olefins, vinyl esters, acrylates, methacrylates, acrylonitrile, methacrylonitrile, acrylamide, methacrylamide, N-vinyl carbazole, N-vinyl pyrrolidone, propylene, and (i) alkenes, vinyl acetate.

It will be understood by those skilled in the art who have the benefit of this disclosure that the references to a monomer throughout this specification and claims also contemplate the co-polymerization of monomers such as maleic acid and styrene to form commercially useful co-polymers, graft polymers, block polymers. Examples of such co-polymerizations can be found, for instance, at column 2, lines 66 et. seq. of U.S. Pat. No. 4,057,521. As is the case for the selection of a particular combination of monomer, crosslinker and initiator for polymerization and cross-linking in accordance with the method of the present invention, the selection of such combinations of monomers is well known in the art and forms no part of the invention hereof such that further description of such co-polymerizations is unnecessary.

In the same manner that the method of the present invention is not restricted with respect to the particular monomer or monomers utilized, a large number of crosslinkers are utilized to advantage. Such crosslinkers include any organic compound capable of reacting with an organic polymer in aqueous solution and include, generally, compounds having at least two polymerizable double bonds, compounds having at least one polymerizable double bond and at least one functional group reactive with an acid-containing monomer or polymer, compounds having at least two functional groups reactive with an acid-containing monomer or polymer, and polyvalent metal compounds which are capable of forming ionic cross-linkages. A non-limiting listing of a number of such crosslinkers includes:

polyvinyls, e.g., divinylbenzene, divinyltoluene, divinyl acid anhydrides, divinyl sulfone, divinyl benzene sulfonate, and their alkyl or halogen-substituted products;

polyesters of unsaturated mono- or poly-carboxylic acids with polyols, e.g., ethylene glycol, trimethylol propane, glycerine, and polyoxyethylene glycols;

bisacrylamides, e.g., N,N'-methylene-bisacrylamide and N,N'-methylenebismethacrylamide;

carbamyl esters obtained by reacting polyisocyanates with hydroxyl-group containing monomers;

di-, tri-, or tetraesters of acrylic or methacrylic acid;

polyallyl esters of polycarboxylic acids, e.g., diallyl phthalate and diallyl adipate;

esters of unsaturated mono- or polycarboxylic acids with mono-allyl esters of polyols, e.g., the acrylic acid of polyethylene glycol monoallyl ether, allyl acrylate, diallyl ethylene glycol ether, and divinyl ether of ethylene tri- or diethylene glycol;

di- or triallylamine, N,N'-diallylacrylamide, diallyl-methacrylamide;

N-methylol acrylamide, N-methyloyl-methacrylamide;

glycidyl acrylate and methacrylate, polyethylene glycol diacrylate, polyethylene glycol dimethacrylate;

substituted hexadienes such as 2,5-dimethyl-3,4-dihydroxy-1,5-hexadiene and 2,5-dimethyl-2,4-hexadiene;

olefinically unsaturated mono- or polycarboxylic acids such as acrylic, methacrylic, crotonic, isocrotonic, angelic, tiglic, senecioic, maleic, fumaric, itaconic, aconitic, teraconic, citraconic, mesaconic, and glutaconic acid;

glyoxal;

polyols, e.g., ethylene glycol and polyhaloalkanols such as 1,3-dichloroisopropanol and 1,3-dibromoisopropanol;

polyamines, e.g., alkylene diamines (ethylene diamine), polyalkylene polyamines, triethanolaminediacrylate and dimethacrylate, triethanolamine triacrylate and trimethacrylate, and diacrylate and dimethacrylate of bishydroxylacetamide;

polyepoxides and haloepoxyalkanes, e.g., epichlorhydrin, epibromohydrin, 2-methyl epichlorhydrin and epi-iodohydrin;

polyglycidyl ethers and polyol polyglycidyl ethers such as ethylene, diethylene, and propylene glycol diglycidyl ether, glycerin triglycidyl ether, glycerin diglycidyl ether and polyethylene glycol diglycidyl ether, tartaric acid diacrylate and trimethacrylate, triethylene glycol diacrylate and dimethacrylate, ethylene glycol dimethacrylate and propylene glycol diacrylate;

oxides;

hydroxides;

weak acid salts (e.g., carbonate, acetate) of alkaline earth metals (calcium, magnesium) and zinc, strontium and barium, e.g., calcium oxide and zinc diacetate; and polyvalent metal salts of acrylic acid and methacrylic acid.

Likewise, it is not intended that the method of the present invention be restricted with respect to the initiator utilized. Radicals can be produced by a variety of thermal, photochemical, and redox (oxidative-reduction) methods known to those skilled in the art. The benefits of initiator selection are also known to those skilled in the art. Appropriate polymerization initiators well known in the art include:

peroxygen compounds (sodium, potassium and ammonium persulfate), hydrogen peroxide, caprylyl and benzol peroxide, cumene hydroperoxides, acetyl peroxide, tert-butyl diterphthlate, tertbutylperbenzoate, sodium peracetate, tertbutylhydroperoxide, sodium percarbonate, and conventional redox initiator systems such as are formed by combining a peroxygen compound with a reducing agent such as sodium or ammonium sulfite or bisulfite, L-ascorbic acid, or ferrous salts;

peroxides in combination with a reducing agent;

tetraphenylsuccinodinitrile, tetra-p-methoxyphenylsuccinodinitrile; and azo initiators such as azobisiso-butyronitrile (AIBN), 4-t-butylazo-4'-cyano-4,4'-azobis (4-cyanovaleric acid), 2,2'-azobis (2-amidino-propane)-hydrochloric acid salt.

It is also common to use mixtures of one or more of such initiators.

The present invention can be better understood by reference to the following, non-limiting examples of cross-linked, water-absorbing polymers produced in accordance with the method described above.

EXAMPLE 1

Aqueous solutions of the initiators sodium persulfate and 2,2'-azobis (2-amidinopropane HCl (ABAH) (Polysciences, Inc., Warrington, Pa.) and ascorbic acid were prepared in the following proportions (all parts by weight):

|  | initiator | water |
|---|---|---|
| sodium persulfate | 0.650 | 12.346 |
| ABAH | 0.975 | 12.021 |
| ascorbic acid | 0.013 | 12.983 |

Other reagents were used in the following proportions:

| water | 29.70% |
|---|---|
| acrylic acid (Catalog No. 14723-0, Aldrich Chemical Co., Milwaukee, WI) | 42.61% |
| triallylamine (Catalog No. T4500-4, Aldrich Chemical Co., Milwaukee, WI) | 0.30% |
| caustic soda | 22.12% |
| ascorbic acid solution | 1.05% |
| ABAH solution | 2.11% |
| sodium persulfate solution | 2.11% |

The water and acrylic acid were mixed while holding the temperature at 10° C. and the triallylamine added. Caustic soda was added at a rate slow enough to hold the temperature under 40° C., then temperature was brought down to 7° C. and held at that temperature as the ascorbic acid and ABAH solutions were added. The resulting aqueous mixture was purged with nitrogen for 4 to 5 minutes and the sodium persulfate added. That mixture was mixed for 30 seconds at a temperature under 37.8° C. The mixture was then sprayed into a reaction chamber constructed in accordance with the teachings of the present invention that was about 4.57 meters high with an atmospheric pressure therein of about 33,860 $N/m^2$ below ambient and which had been heated to about 107.2° C. The resulting water-absorbing spherical particles were smooth surfaced, ranged between about 50 to about 100 microns in diameter, and had a water content of about 2%.

EXAMPLE 2

The method described in Example 1 was modified by using the following proportions of reagents:

| | |
|---|---|
| water | 26.00% |
| acrylic acid (see Example 1) | 44.85% |
| triallylamine (see Example 1) | 0.31% |
| caustic soda | 23.29% |
| ascorbic acid solution | 1.11% |
| ABAH solution | 2.22% |
| sodium persulfate solution | 2.22% |

All process parameters were the same as in Example 1 except that the temperature of the reaction chamber 12 was 65.6° C. and the pressure of the atmosphere in the reaction chamber 12 was not reduced below ambient pressure. Although the resulting spherical particles were smooth surfaced and capable of efficient water absorption, water content was about 8%. When repeated using potassium hydroxide in place of caustic soda, yield dropped by about 50%.

EXAMPLE 3

The method described in Example 1 was modified by omission of the initiator ascorbic acid. The resulting smooth-surfaced spherical particles were obtained in approximately the same yield and size as obtained in Example 1, but water content was about 4%.

The polymerization process of the present invention produces a dry powder-like particle, eliminating the need for drying, grinding, pulverizing and/or other methods to produce suitable for immediate use in the range of from about 2 to 125,000 microns in size. Moreover, this invention utilizes liquid monomer sources to produce a substantially dry polymer particle which does not rely upon a substrate on which to initiate formation.

The process and apparatus described herein may also be used in the continuous preparation of soaps and detergents. The raw materials of soap or detergent production are mixed and/or homogenized, and subjected to treatments, as known to those skilled in the art to prepare a liquid mixture of soap- or detergent-making compounds. The liquid mixture is then sprayed into the reaction chamber according to the above description. Standard soap and detergent formulations known to those skilled in the art may be used to prepare a substantially dry powdered soap or detergent.

The preparation of a soap or detergent will not require that the temperature in the feed line of the above-described process and apparatus be reduced. The liquid mixture will however, be subjected to pressure in the line and to the spraying and chamber conditions described above. varying chamber pressure and temperature as described above will produce similar results in detergent and soap production as are obtained from monomer polymerization.

The process and apparatus described herein may also be used in the preparation of several novel polymer products. Foremost, it has been found that by altering the operational parameters of the apparatus, not only is the size and density of the product varied, but the shape and physical properties of the products are varied as well. More particularly, when the apparatus is operated at lower pressures and higher temperatures, the water or other solvent in the mixture droplets is violently released during polymerization. The result is a substantially dry polymer product which has a puffed out irregular shape not unlike cooked popcorn. The novelty of this product is believed to be in its irregular puffed shape, its low density, and in the case of the water absorbing polymers, an enhanced ability to absorb water or urine due to an increase in the polymer's surface area. Further, a product with these characteristics is obtained without spray drying or additional processing as is required in the known processes for obtaining similar products.

Similar known products do not have the same degree of irregularity in their shape as they are most commonly formed through the mechanical processes of pulverizing and chopping a mass of polymer material. Thus, known irregularly shaped polymers have less surface area and commonly have higher densities. Known methods for obtaining irregularly shaped polymer products are described in U.S. Pat. No. Re. 32,649 entitled "Hydrogel-Forming Polymer Compositions For Use in Absorbent Structures," reissued to Brandt et al. on Apr. 19, 1988 and U.S. Pat. No. 4,625,001 entitled "Method for Continuous Production Of Cross-Linked Polymer" issued to Tsubakimoto et al. on Nov. 25, 1986. These patents are incorporated herein by reference.

An additional novel product is obtained from the process and apparatus described herein in the form of a substantially dry pigmented copolymer product for use in powder coating techniques. To obtain this product the process further comprises the steps of adding a second monomer to the first mixture and the step of adding a pigment to the first mixture. The homogenized mixture is then sprayed into the apparatus forming mixture droplets which polymerize during free fall. The product obtained from this process is a substantially dry, pigmented copolymer that is radiation curable for use in powder coating applications; additional chemical or mechanical processing of the copolymer product is not required.

The production of copolymers for use as binders in powder coatings is described in U.S. Pat. No. 5,484,850 entitled "Copolymers Crosslinkable By A Free Radical Method" issued to Kempter et al. on Jan. 16, 1996. This patents is incorporated herein by reference. As described in the Kempter patent, copolymers for use in powder coatings typically require several manufacturing steps in their production. The monomer reagents are first polymerized into a copolymer. The copolymer is then dispersed or dissolved in an emulsion or solution in order to introduce additives by various known techniques. Lastly, the copolymer composition is dried in a conventional manner. A substantially dry, colored copolymer is formed from a homogenized mixture of monomers and various additives in a single step in the process and apparatus described herein.

The term "controlled atmosphere" as used herein describes the internal condition of the apparatus and the reaction conditions of the polymerization process. As such, "controlled atmosphere" refers to an atmosphere that is substantially static. Any currents or movement of gases within the apparatus or in the vicinity of where the polymerization process is being carried out should be minimized; there should be no currents or turbulence present to interfere with the free fall of the polymerizing droplets. While the droplets are generally described as falling through the apparatus, they are more accurately described as experiencing a free fall, which is preferably influenced only by the force of gravity.

Those skilled in the art who have the benefit of this disclosure will recognize that the above examples are set out by way of exemplification and for the purpose of complying with the requirements of the Patent Statute, and that those examples are not intended to limit the scope of the present invention. Likewise, with respect to the apparatus 10, it will be recognized that changes can be made to the individual structural elements comprising that apparatus without changing the manner in which those elements function to achieve the intended result thereof. All such changes are intended to fall within the scope of the following claims.

What is claimed is:

1. A small particle size, substantially dry, water absorbing crosslinked polymer made by the process, comprising the steps of:

preparing a mixture of a monomer, a crosslinker and an initiator in water;

heating the atmosphere of a reaction chamber to between about 70° F. and about 300° F., defined by a vessel;

controlling the pressure of the atmosphere in the reaction chamber from about 0.1 to about 30.0 inches of Hg relative to ambient pressure;

spraying the mixture into the heated pressure controlled atmosphere forming free-falling droplets;

allowing the droplets to fall through the heated, pressure controlled atmosphere for a period of time sufficient to obtain the desired degree of polymerization of the monomer and crosslinking of the polymerized monomer and to form dry particles of flowable water-absorbing polymer powder; and removing fallen particles of dry water-absorbing polymer powder that collect at the bottom of the reaction chamber while maintaining the reduced pressure therein and continuously producing polymer; and wherein a small particle size, substantially dry, water absorbing crosslinked polymer is produced, the polymer having a substantially smooth and spherical shape, a water content of less than about 2 percent by weight and a particle size of less than about 50 microns.

\* \* \* \* \*

UNITED STATES PATENT AND TRADEMARK OFFICE
CERTIFICATE OF CORRECTION

PATENT NO.      : 6,399,730 B1
DATED           : June 4, 2002
INVENTOR(S)     : Clarence S. Freeman, Matthew Max Freeman and Jon Joseph Freeman It is certified that error appears in the above-identified patent and that said Letters Patent is hereby corrected as shown below:

<u>Title page,</u>
Item [63]:
Line 1, please replace the word "Continuation" with -- Divisional --.

Signed and Sealed this

Fourth Day of February, 2003

JAMES E. ROGAN
*Director of the United States Patent and Trademark Office*